May 16, 1950           R. T. WHITNEY           2,508,206
BRAKE CYLINDER PRESSURE CONTROL VALVE DEVICE
Filed Nov. 1, 1947
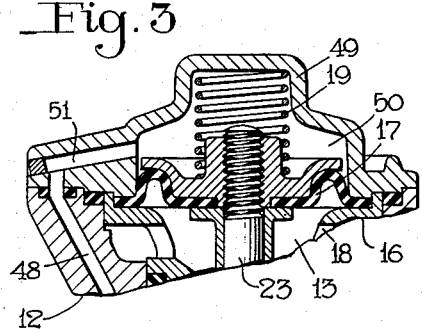
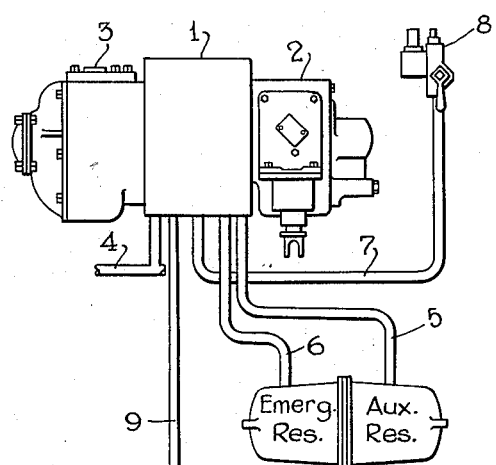
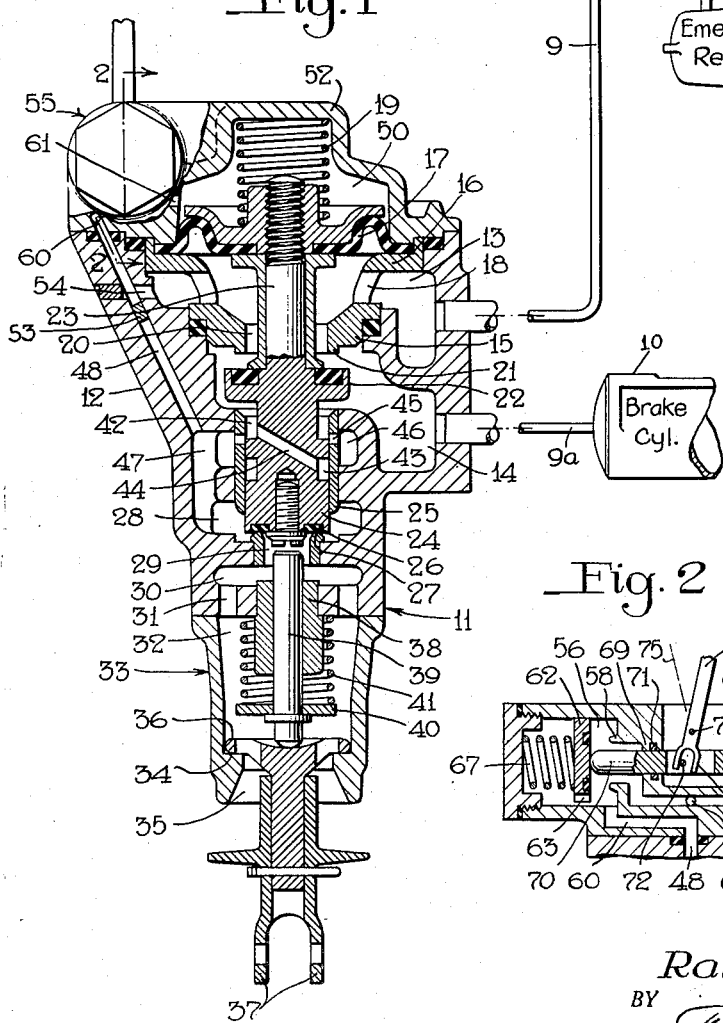
INVENTOR.
Ralph T. Whitney
BY
Frank E. Miller
ATTORNEY Patented May 16, 1950

2,508,206

UNITED STATES PATENT OFFICE 2,508,206

BRAKE CYLINDER PRESSURE CONTROL VALVE DEVICE

Ralph T. Whitney, Irwin, Pa., assignor to The Westinghouse Air Brake Company, Wilmerding, Pa., a corporation of Pennsylvania Application November 1, 1947, Serial No. 783,517

15 Claims. (Cl. 303—68)

This invention relates to automatic fluid pressure brake equipment, such as the AB type, for railway vehicles, and more particularly to means for releasing and reapplying by fluid under pressure the brakes on a vehicle with the brake pipe completely vented.

When a vehicle provided with such equipment and having the reservoir or reservoirs thereof charged with fluid under pressure is cut out of a train for switching operation, inspection of the brake equipment or the like, the brake pipe is completely vented and the brake controlling valve device will move to emergency position and establish communication between said reservoir or reservoirs and a brake cylinder device, whereupon the pressure of fluid in said reservoir or reservoirs will equalize into said brake cylinder device and effect an emergency application of the brakes on the vehicle.

To permit movement of the vehicle for switching purposes it is then necessary to release the fluid under pressure from the brake cylinder device and it is desirable to effect such release without dissipating the fluid pressure still remaining in the reservoir or reservoirs, so that when the vehicle is reconnected into a train less fluid under pressure and less time will be required to recharge the train so as to expedite its movement. Further, if on inspection, it is found desirable to adjust the brake equipment, as in case of excessive brake cylinder piston travel, or to renew badly worn brake shoes, it is also necessary to release the fluid under pressure from the brake cylinder device to effect the adjustment or for replacing the brake shoes and to then resupply fluid under pressure to the brake cylinder device to reapply the brakes for checking the adjustment.

One object of the invention is therefore the provision of an improved release and application valve device for use on railway vehicles and which is adapted to be operated manually by a trainman, either while riding the vehicle or from the ground, and with the brake pipe completely vented, for releasing fluid under pressure from the brake cylinder device to release the brakes on the vehicle without losing the fluid pressure still remaining in the reservoir or reservoirs thereon, and for reapplying the brakes, if necessary or desirable, by supplying fluid under pressure thus retained in said reservoir or reservoirs to the brake cylinder device.

If the brake release and application valve device is in its brake release position for releasing fluid under pressure from the brake cylinder device at the time a vehicle is cut into a train, it is desirable, upon recharging of the brake equipment on the vehicle through the brake pipe, that said device automatically return to its normal position for reconnecting the brake cylinder device to the brake controlling valve device to permit normal control of the brakes on the vehicle by said brake controlling valve device, even if the usual brake cylinder pressure retaining valve device on the vehicle is turned up for holding a certain minimum pressure of fluid in the brake cylinder device, and another object of the invention is the provision of an improved brake release and application valve device which will automatically operate in this manner.

In U. S. Patent No. 2,392,185, issued to L. I. Pickert on January 1, 1946, there is disclosed a brake release valve device adapted to be operated by a trainman when the brake pipe is completely vented for releasing the brakes on a vehicle without dissipating the fluid pressure remaining in the auxiliary and emergency reservoirs at the time, and another object of the invention is to provide, by a relatively simple modification of said device, a device for accomplishing the additional feature of being able to employ such fluid under pressure for reapplying the brakes on the vehicle with the brake pipe still vented.

The brake release valve device disclosed in the above mentioned patent is adapted to be interposed in the brake cylinder pipe between the AB control valve and brake cylinder device on the vehicle and comprises a main body part containing valve means having a normal position for opening the brake cylinder device to the AB control valve and a brake release position for disconnecting the brake cylinder device from the AB control valve and for opening same to atmosphere. A flexible diaphragm disposed at one side of the valve means is clamped between the main body part and a cover and is open at the valve means side to the portion of the brake cylinder pipe connected to the AB control valve.

The valve means in their normal position opens a communication through passages in the body and cover, respectively, between the valve means side and the opposite side of the diaphragm for equalizing the pressures of fluid thereon to render a spring effective to hold said valve means in said position. Manual means associated with the body part is operative to initiate movement of the valve means from their normal position in the direction of their brake release position and upon such initiation and in said brake release position said valve means opens the opposite side of the diaphragm to atmosphere, so that the pressure of fluid from the AB control valve acting on the valve means side of the diaphragm may actuate said valve means to and then hold same in said brake release position, until subsequently, when the AB control valve operates in response to recharging of the brake pipe to open the brake cylinder pipe to atmosphere, the release of fluid under pressure from the valve means side of the diaphragm will permit the spring to return the valve means to normal position.

With the brake pipe vented the brake release valve device just described is not operative to reapply the brakes on the vehicle by fluid under pressure remaining in the auxiliary and emergency reservoirs following a release of the brakes, as is very desirable for reasons before explained. According to the last mentioned object I attain this additional and desirable feature, however, merely by using a manually operative pilot valve means preferably formed integral with a different cover for the body portion of the device, by placing a plug in the body passage above mentioned and drilling a port in the body part to connect said passage, between said plug and the cover, to the valve means side of the diaphragm. The pilot valve means is operative to either establish communication between the opposite sides of the diaphragm through the port and connected part of the passage just mentioned or for closing said communication and for opening to atmosphere the side of the diaphragm opposite the valve means side, whereby the spring above mentioned may actuate the valve means to normal position or the diaphragm may actuate the valve means to brake release position, respectively.

The invention thus contemplates salvaging and converting the major portion of brake release valve devices of the type disclosed in the above mentioned patent which are in use or manufactured for use, by the slight modifications above mentioned to provide an operation or result not originally intended. When converted as above mentioned the manually operable means originally provided for initiating movement of the valve means to their brake release position may be dispensed with, since they are no longer necessary to the device, or they may be allowed to remain without detriment, as desired.

Other objects and advantages of the invention will become apparent from the following more detailed description thereof.

In the accompanying drawing, Fig. 1 is a diagrammatic view of a fluid pressure brake equipment embodying, in section, my improved brake release and application valve device; Fig. 2 is a sectional view taken on the line 2—2 in Fig. 1; and Fig. 3 is a sectional view of a portion of the valve device being salvaged and converted in accordance with the invention.

Description

As shown in the drawing, 1 designates a pipe bracket of an AB control valve, the service portion is indicated by 2 and the emergency portion by 3. 4 designates the brake pipe connected to the AB control valve, and 5 and 6 designate pipes connecting, respectively, the auxiliary and emergency reservoirs to the AB control valve. 7 designates the brake cylinder release pipe of the AB control valve connected to the usual brake cylinder pressure retaining valve device 8, and 9 designates the brake cylinder or application and release pipe connected to said control valve and adapted to be connected to the usual brake cylinder device 10.

All of the parts so far described are of known construction, the AB control valve being standard on American railroads.

Interposed in and controlling communication between the brake cylinder pipe 9 and a pipe 9a connected to the brake cylinder device 10 is a brake release and application valve device 11 embodying the subject matter of the present invention.

The brake cylinder release and application valve device 11 comprises a main body portion 12 having chambers 13 and 14 open, respectively, to the portion of the brake cylinder pipe 9 connected to the AB control valve and to that portion 9a connected to the brake cylinder device 10. Chambers 13 and 14 are separated by a partition wall 15 formed on one end of a cage 16 mounted in one end of the body portion 12. The other end of the cage 16 constitutes a clamping ring for one side of a flexible diaphragm 17. Chamber 13 is open to the one side of diaphragm 17 through perforations 18 in the cage 16. The opposite side of diaphragm 17 is subject to the pressure of one end of a control spring 19.

The partition wall 15 is provided with an aperture 20 arranged in coaxial relation to diaphragm 17 and forming a communication between chambers 13 and 14, and surrounding said aperture and extending into the latter chamber is a valve seat 21 arranged for engagement by a poppet valve 22 contained in chamber 14 for closing said communication. The valve 22 is provided on a stem 23 freely extending through the aperture 20 and chamber 13 and secured at one end to diaphragm 17. At the opposite side of valve 22 the stem 23 has a slide valve 24 of cylindrical form slidably mounted in a bushing 25 secured in the casing. On the end of slide valve 24 opposite the valve 22 is formed a brake cylinder release valve 26. The main body portion 12 is provided with an annular seat rib 27 arranged to be engaged by the release valve 26 for closing communication between a chamber 28 in body portion 12 and a passage 29 encircled by said seat and opening to a chamber 30. The chamber 30 is in turn open through one or more ports 31 in the body portion to a chamber 32 formed in a cover member 33 secured to the lower end of the body portion 12. The lower end of member 33 is provided with an inturned annular shoulder 34 encircling an opening 35 leading to atmosphere. Mounted in the opening 35 is a universally tiltable actuator comprising a ported head 36 which seats at its margin on the shoulder 34 and which has at its lower end a fork 37 to which an actuating rod (not shown) may be connected.

The ports 31 in the main body portion 12 surround an opening axially aligned with the release valve 26 and ported head 36 and in said opening is securing a bushing 38. Slidably mounted in an axial bore in bushing 38 is a pin 39 having one end disposed in passage 29 for contact with the release valve 26 while the other end is disposed in chamber 32 and engages the ported head 36. A washer 40 secured to the pin 39 in chamber 32 is engaged by one end of a spring 41 the opposite end of which is supported by the main body portion 12. The spring 41 is under pressure for constantly urging the ported head 36 into contact with shoulder 34.

The slide valve 24 is provided with two spaced apart annular grooves 42 and 43 which are connected together by a diagonal passage 44 in said valve. One end of the annular groove 42 is constantly open to chamber 14 and with the valve 22 open and the valve 26 seated said groove is also open to one or more ports 45 provided in the bushing 25 and opening to an annular passage 46 encircling said bushing. The passage 46 is in turn open by way of a passage 47 to the release valve chamber 28. The passage 47 is also open to a passage 48 extending to the end of the main body portion 12 opposite the member 33. In a brake release position of the structure in which the valve 22 is adapted to be seated against seat 21 and in which the brake cylinder release valve 26 is adapted to be unseated, ports 45 in the bushing 25 are adapted to be open to the annular groove 43.

The device as so far described is commercial and while differing slightly in structure from that disclosed in the Pickert patent above referred to, is operative in the same manner and to accomplish the same result. The commercial structure as well as that disclosed in the Pickert patent also comprises a cover 49, such as shown in Fig. 3 of the drawing, adapted to be mounted against the upper end of the main body portion 12 of the device for securing the peripheral edge of the diaphragm 17 in place and for providing a seat for the upper end of spring 19. This cover also provides a chamber 50 at the upper side of diaphragm 17 containing spring 19 and open by a passage 51 in said cover to the body passage 48 whereby chamber 50 is constantly open to passage 47 in the body portion 12.

The operation of the structure so far described is the same as of the device disclosed in the Pickert patent and briefly is as follows:

When a vehicle carrying the brake equipment is fully charged with fluid under pressure and cut out of a train, the brake pipe 4 is vented and the AB control valve establishes communication between the auxiliary and emergency reservoirs and the brake cylinder pipe 9 connected thereto, through which such fluid flows to chamber 13 in the brake cylinder release and application valve device 11 and thence past the normally open valve 22 into chamber 14 and from the latter chamber equalizes through pipe 9a into the brake cylinder device 10 for applying the brakes on the vehicle. As fluid under pressure thus flows to the brake cylinder device it will equalize through the annular groove 42 in slide valve 24 and the ports 45 in bushing 25 into passage 47 and thence through passage 48 in the main body portion and passage 51 in cover 49 into chamber 50 at such a rate as to enable spring 19 to hold the diaphragm 17 in the position in which it is shown in the drawing against the pressure of fluid from chamber 13 acting on its opposite side.

If the trainman desires to release an application of brakes thus effected without losing or dissipating the fluid pressure still remaining in the auxiliary and emergency reservoirs he will actuate the fork 37 to tilt the ported head 36 on shoulder 34 and this will move pin 39 against spring 41 first into contact with the release valve 26 and then unseat said valve from rib 27. As the valve 26 is thus unseated the slide valve 24 will be operated to close communication between the annular groove 42 and ports 45 whereupon fluid under pressure will be suddenly vented from chamber 50 above the diaphragm 17 to atmosphere through passages 51, 48, 47 and past said release valve. The reduction in pressure of fluid in chamber 50 will then permit pressure of fluid in chamber 13 acting on the opposite side of diaphragm 17 to move said diaphragm against spring 19 for pulling the valve 22 into contact with its seat 21. With the valve 22 seated the brake cylinder device 10 will be open to atmosphere through the annular groove 42, the diagonal passage 44 and the annular groove 43 in the slide valve 24, ports 45 in the bushing 23, passage 47, chamber 28 and past the release valve 26, whereby the brakes on the vehicle will be released while the seated valve 22 will hold the fluid pressure still remaining in the auxiliary and emergency reservoirs.

The only manner in which the valve 22 can be reopened and valve 26 closed is by venting fluid under pressure from chamber 13 upon subsequent recharging of the brake pipe 4 and operation of the AB control valve to connect the brake cylinder pipe 9 to the brake cylinder release pipe 7 and thence to the retaining valve device 8. When this occurs and the pressure of fluid in chamber 13 is reduced sufficiently spring 19 will reopen the valve 22 and close the valve 26 thereby reestablishing communication between the brake cylinder device 10 and the AB control valve. It is impossible with the structure so far described to reapply the brakes on the vehicle, subsequent to a release thereof such as just described, by fluid under pressure retained in the auxiliary and emergency reservoirs during such release.

According to the invention I preferably replace cover 49 (Fig. 3) with a cover 52 (Fig. 1), the cover 52 being secured to the upper end of the body portion 12 for clamping the diaphragm 17 in place and having a chamber 50 for containing spring 19, the same as cover 49. I also place a plug 53 in passage 48 for closing communication between passage 47 in the main body portion 12 and the upper end of passage 48, while above said plug the main body portion 12 is drilled to provide a passage 54 opening the portion of said passage above said plug to chamber 13 below the diaphragm 17.

Preferably formed integral with the cover 52 is a pilot valve device 55 having two spaced apart chambers 56 and 57 on the adjacent end walls of which are provided annular seats 58 and 59, respectively, extending into said chambers. The chamber 56 is open through a passage 60 in cover 52 to passage 48 at the upper end of the main body portion 12, while the chamber 57 is open through a passage 61 in the cover to chamber 50 therein.

A valve structure preferably in the form of a check valve 62 is slidably mounted in chamber 56 for cooperation with the valve seat 58 to control communication between said chamber and passage 61 one end of which passage is encircled by said valve seat. The check valve 62 is provided around its peripheral edge with one or more openings 63 for equalizing fluid pressure on opposite sides of said valve. A similar valve 64 contained in chamber 57 is arranged for cooperation with valve seat 59 to control communication between passage 61 and said chamber and a passage 65 encircled by said seat and opening to a chamber 66 which is open to atmosphere. A light spring 67 contained in chamber 56 acts on the valve 62 for urging it toward its seat 58, while a heavier spring 68 contained in chamber 57 acts on the valve 64 for the same purpose and for also unseating the valve 62 against pressure of fluid in chamber 56 such as might be retained by the usual brake cylinder pressure retaining valve device 8.

The chamber 66 is separated from the portion of passage 61 opening to valve seat 58 by a partition wall 69 having a through bore in coaxial relation to the valves 62 and 64 and in this bore is slidably mounted a pin 70 the opposite ends of which engage said valves. A sealing ring 71 carried by the partition 69 has sealing and sliding contact with pin 70 for preventing leakage of fluid under pressure from passage 61 to chamber 66. In chamber 66, the pin 70 is provided with an operating pin 72 disposed between the prongs of an operating fork 73 provided on one end of a lever 74 which is fulcrumed on a pin 75 secured in the casing of the pilot valve device. The lever 74 has two positions, namely a normal position in which it is shown in the drawing and a brake release position such as indicated by a dot-dash line 75 and is adapted to be moved to its different positions by any suitable means (not shown) arranged for operation by a trainman either while riding a vehicle or from the ground.

The operation of the improved brake release and application valve device is as follows:

With the parts of the pilot valve device 55 in the position in which they are shown in the drawing at the time a vehicle is set out of a train and the brake pipe 4 is completely vented and the auxiliary and emergency reservoirs are open to the brake cylinder pipe 9, the pressure of fluid in said reservoirs will equalize into chamber 13 and thence past the open valve 22 into chamber 14 and into the brake cylinder device 10 for applying the brakes on the vehicle. As fluid under pressure thus flows into chamber 13 it will flow therefrom through passage 54 to passage 60 in the pilot valve device and thence to chamber 56 therein and past the open check valve 62 to passage 61 and into diaphragm chamber 50, at such a rate with respect to the supply of fluid under pressure to chamber 13 as to enable spring 19 to hold the diaphragm 17 in the position in which it is shown in the drawing for thereby maintaining the valve 22 open and the valve 26 closed.

As fluid under pressure is supplied through passage 61 to diaphragm chamber 50 it will also flow from said passage into check valve chamber 57. With the check valve 64 seated and the portion of the left-hand face thereof within the valve seat 59 subject to atmospheric pressures the pressure of fluid acting on the opposite face in chamber 57 will provide a force to positively hold said check valve in its seated position for preventing leakage of fluid under pressure from the brake cylinder device 10, thereby assuring that the brake cylinder device will maintain the brakes applied as intended.

To now release the fluid under pressure from the brake cylinder device 10 for releasing the brakes on the vehicle without dissipating the fluid under pressure still remaining in the auxiliary and emergency reservoirs, the operator will actuate the lever 74 from the normal position in which it is shown in the drawing in a counterclockwise direction to the brake release position indicated by the dot-dash line 75. As the lever 74 is thus operated the pin 70 will be actuated to unseat the check valve 64 and at the same time permit movement of the check valve 62 into contact with its seat under pressure of spring 67. When the check valve 62 is thus closed, supply of fluid from diaphragm chamber 13 through passage 61 to diaphragm chamber 50 is cut off, while the latter chamber is open to atmosphere past the open check valve 64 whereupon fluid under pressure will be suddenly released from chamber 50 to permit pressure of fluid in chamber 13 acting on the opposite side of diaphragm 17 to deflect said diaphragm in an upwardly direction for seating valve 22 and unseating valve 26. The seating of valve 22 closes communication between the auxiliary and emergency reservoirs and the brake cylinder device 10, while the opening of valve 26 opens said brake cylinder device to atmosphere, for thereby releasing fluid under pressure therefrom to release the brakes on the vehicle, without, however, dissipating the fluid under pressure still remaining in the auxiliary and emergency reservoirs. With the check valve 62 seated and the check valve 64 open it will be noted that the area of the right-hand face of the check valve 62, within the valve seat 58, is exposed to pressure in passage 61 which is open to atmosphere whereby a differential in forces is obtained on the check valve 62 to insure that it remains seated for preventing loss of fluid under pressure from chamber 13 and the auxiliary and emergency reservoirs.

If after the brakes on the vehicle are released, as just described, the operator desires to reapply the brakes by fluid under pressure still remaining in the auxiliary and emergency reservoirs, he will actuate lever 74 from its brake release position indicated by the dot-dash line 75 to its normal position in which it is shown in the drawing. This movement of lever 74 will actuate the pin 70 to open the check valve 62 and at the same time permit check valve 64 to be closed by spring 68. With the check valve 62 thus reopened the pressure of fluid in chamber 13 below the diaphragm 17 will equalize through passages 54 and 60, past the check valve 62 and through passage 61 into chamber 50 above the diaphragm 17, whereupon spring 19 will deflect said diaphragm and open the valve 22 and close the valve 26. Fluid under pressure in the auxiliary and emergency reservoirs will then equalize past the open valve 22 into the brake cylinder device 10 for applying the brakes on the vehicle. To release an application of brakes thus effected the lever 74 of the pilot valve device 55 need only again be moved to its brake release position, indicated by the dot-dash line 75, while if another reapplication of brakes is desired said lever need only be returned to its normal position, as will be clear from the above description.

With the brake pipe 4 vented and the auxiliary and emergency reservoirs open to the portion of the brake cylinder pipe 9 connected to the AB control valve, the brakes on the vehicle may be released and reapplied in the manner just described as long as sufficient pressure of fluid remains in the auxiliary and emergency reservoirs for actuating the brake cylinder device 10.

When the vehicle is cut into a train and the brake pipe 4 is recharged causing operation of the AB control valve to open the portion of pipe 9 connected thereto to the brake cylinder release pipe 7 and thence to the retaining valve device 8, if the parts of the improved brake release and application valve device 11 are in their normal position, in which they are shown in the drawing, opening the brake cylinder 10 to the AB control valve no change in position of said parts will occur. Under this condition fluid pressure remaining in the brake cylinder device 10 will be merely vented to atmosphere through the retaining valve device 8, and if the retaining valve device is turned up for retaining a certain pressure of fluid in said brake cylinder device the pressure therein will merely reduce to that degree. As the pressure of fluid in chamber 13 thus reduces the pressure of fluid in chamber 50 at the opposite side of diaphragm 17 will correspondingly reduce past the open check valve 62, so that spring 19 will hold the valve 22 open and the valve 26 closed.

If, however, the parts of the improved brake release and application valve device 11 are in their brake release position with valve 22 closed and valve 26 open at the time the portion of the brake cylinder pipe 9 is connected to the brake cylinder release pipe 7, the pressure of fluid in check valve chamber 56 will reduce through passages 60 and 54 as the pressure of fluid in chamber 13 is reduced through the retaining valve device 8, and when this pressure becomes reduced to a sufficiently low degree, which may be slightly in excess of that desired to be retained in the brake cylinder device 10 with the pressure retaining valve device 8 turned up for grade operation, spring 68 will unseat the check valve 62 against the light spring 67 and at the same time close check valve 64, whereupon the pressure of fluid in diaphragm chamber 13 will equalize into chamber 50 at the opposite side of diaphragm 17 for rendering spring 19 effective to open valve 22 and close valve 26. Thus even with the retaining valve device turned up for retaining a certain pressure of fluid in the brake cylinder device 10 as for subsequent grade operation of the vehicle, the improved brake release and application valve device 11 will automatically reconnect the brake cylinder device 10 to the AB control valve for insuring proper control of the brakes on the vehicle during subsequent operation thereof in a train.

*Conclusion*

It will now be seen that I have provided an improved brake release and reapplication valve device for use when a vehicle is cut out of a train with the brake pipe completely vented, for releasing the brakes on the vehicle without losing the fluid pressure still remaining in the auxiliary and emergency reservoirs, and for reapplying the brakes with such fluid, if such is desired. This improved valve device may be produced merely by placing a plug in one passage and providing a new passage in the main body portion of a brake release device such as disclosed in the Pickert patent above referred to, and by the provision of a pilot valve device, preferably formed integral with a new cover for said device whereby the major portion of the Pickert structure can be used.

It will also be noted that where the Pickert structure is converted as just mentioned there is no need for the cover member 33 and the parts carried thereby and contained therein including the bushing 38, but these parts may be allowed to remain on the main body portion 12 of the device without detriment, if such is desired.

Having now described the invention, what I claim as new and desire to secure by Letters Patent is:

1. A brake release and application valve device for use with a vehicle fluid pressure brake equipment of the type comprising a brake pipe, at least one normally charged fluid pressure storage reservoir, a brake application and release pipe, a device operable by fluid under pressure to effect an application of brakes on the vehicle and operable upon release of fluid under pressure to effect a release of the vehicle brakes, a brake controlling valve device operable upon a reduction in brake pipe pressure to open said reservoir to said application and release pipe and operative upon supply of fluid under pressure to said brake pipe to disconnect said reservoir from said application and release pipe and open said pipe to a brake release pipe, said brake release and application valve device comprising valve structure controlling communication between said application and release pipe and said fluid pressure operable device and having a normal position for opening said communication and a brake release position for closing said communication and for releasing fluid under pressure from said fluid pressure operable device, movable abutment means subject to pressure of fluid in said application and release pipe and operable thereby upon release of an opposing fluid pressure in a chamber to move said valve means to said brake release position, spring means for moving said valve means to said normal position upon opening said chamber to said application and release pipe, and valve means having a normal position for establishing, independently of said valve structure, a direct communication between said application and release pipe and said chamber and operative to a brake release position for closing said direct communication and for opening said chamber to atmosphere.

2. A brake release and application valve device for use with a vehicle fluid pressure brake equipment of the type comprising a brake pipe, at least one normally charged fluid pressure storage reservoir, a brake application and release pipe, a device operable by fluid under pressure to effect an application of brakes on the vehicle and operable upon release of fluid under pressure to effect a release of the vehicle brakes, a brake controlling valve device operable upon a reduction in brake pipe pressure to open said reservoir to said application and release pipe and operative upon supply of fluid under pressure to said brake pipe to disconnect said reservoir from said application and release pipe and open said pipe to a brake release pipe, said brake release and application valve device comprising valve structure controlling communication between said application and release pipe and said fluid pressure operable device and having a normal position for opening said communication and a brake release position for closing said communication and for releasing fluid under pressure from said fluid pressure operable device, movable abutment means subject to pressure of fluid in said application and release pipe and operable thereby upon release of an opposing fluid pressure in a chamber to move said valve means to said brake release position, spring means for moving said valve means to said normal position upon opening said chamber to said application and release pipe, a normally open communication, separate from said valve structure, between said chamber and said application and release pipe, and manually operable valve means controlling said normally open communication and selectively operative to either open said normally open communication or to close said normally open communication and vent fluid under pressure from said chamber.

3. A brake release and application valve device for use with a vehicle fluid pressure brake equipment of the type comprising a brake pipe, at least one normally charged fluid pressure storage reservoir, a brake application and release pipe, a device operable by fluid under pressure to effect an application of brakes on the vehicle and operable upon release of fluid under pressure to effect a release of the vehicle brakes, a brake controlling valve device operable upon a reduction in brake pipe pressure to open said reservoir to said application and release pipe and operative upon supply of fluid under pressure to said brake pipe to disconnect said reservoir from said application and release pipe and open said pipe to a brake release pipe, said brake release and application valve device comprising valve structure controlling communication between said application and release pipe and said fluid pressure operable device and having a normal position for opening said communication and a brake release position for closing said communication and for releasing fluid under pressure from said fluid pressure operable device, movable abutment means subject to pressure of fluid in said application and release pipe and operable thereby upon release of an opposing fluid pressure in a chamber to move said valve means to said brake release position, spring means for moving said valve means to said normal position upon opening said chamber to said application and release pipe, a pair of valve means one for controlling communication between said application and release pipe and said chamber and the other for controlling communication between said chamber and atmosphere, and manually operable means for effecting operation of said one valve means to close the respective communication in unison with operation of the other valve means to open the respective communication, and vice versa.

4. A brake release and application valve device for use with a vehicle fluid pressure brake equipment of the type comprising a brake pipe, at least one normally charged fluid pressure storage reservoir, a brake application and release pipe, a device operable by fluid under pressure to effect an application of brakes on the vehicle and operable upon release of fluid under pressure to effect a release of the vehicle brakes, a brake controlling valve device operable upon a reduction in brake pipe pressure to open said reservoir to said application and release pipe and operative upon supply of fluid under pressure to said brake pipe to disconnect said reservoir from said application and release pipe and open said pipe to a brake release pipe, said brake release and application valve device comprising valve structure controlling communication between said application and release pipe and said fluid pressure operable device and having a normal position for opening said communication and a brake release position for closing said communication and for releasing fluid under pressure from said fluid pressure operable device, movable abutment means subject to pressure of fluid in said application and release pipe and operable thereby upon release of an opposing fluid pressure in a chamber to move said valve means to said brake release position, spring means for moving said valve means to said normal position upon opening said chamber to said application and release pipe, a second chamber open to said application and release pipe, a third chamber open to the first named chamber, one valve means in said second chamber arranged to control communication therebetween and said first chamber, another valve means in said third chamber for controlling communication between said first chamber and atmosphere, a member connecting said one and other valve means for operating either to open the respective communication and for at the same time effecting operation of the other to effect closure of the respective communication, and means for operating said member.

5. A brake release and application valve device for use with a vehicle fluid pressure brake equipment of the type comprising a brake pipe, at least one normally charged fluid pressure storage reservoir, a brake application and release pipe, a device operable by fluid under pressure to effect an application of brakes on the vehicle and operable upon release of fluid under pressure to effect a release of the vehicle brakes, a brake controlling valve device operable upon a reduction in brake pipe pressure to open said reservoir to said application and release pipe and operative upon supply of fluid under pressure to said brake pipe to disconnect said reservoir from said application and release pipe and open said pipe to a brake release pipe, said brake release and application valve device comprising valve structure controlling communication between said application and release pipe and said fluid pressure operable device and having a normal position for opening said communication and a brake release position for closing said communication and for releasing fluid under pressure from said fluid pressure operable device, movable abutment means subject on one side to pressure of fluid in a first chamber open to said application and release pipe and subject on the opposite side to pressure of fluid in a second chamber and operable by pressure of fluid in said first chamber upon release of fluid under pressure from said second chamber to move said valve structure to said brake release position, spring means for moving said valve structure to said normal position upon supply of fluid under pressure to said first chamber, a first passage in constant communication with said first chamber, a second passage in constant communication with said second chamber, and valve means for selectively opening said second passage either to said first passage or to a vent.

6. A brake release and application valve device for use with a vehicle fluid pressure brake equipment of the type comprising a brake pipe, at least one normally charged fluid pressure storage reservoir, a brake application and release pipe, a device operable by fluid under pressure to effect an application of brakes on the vehicle and operable upon release of fluid under pressure to effect a release of the vehicle brakes, a brake controlling valve device operable upon a reduction in brake pipe pressure to open said reservoir to said application and release pipe and operative upon supply of fluid under pressure to said brake pipe to disconnect said reservoir from said application and release pipe and open said pipe to a brake release pipe, said brake release and application valve device comprising valve structure controlling communication between said application and release pipe and said fluid pressure operable device and having a normal position for opening said communication and a brake release position for closing said communication and for releasing fluid under pressure from said fluid pressure operable device, movable abutment means subject on one side to pressure of fluid in a first chamber open to said application and release pipe and subject on the opposite side to pressure of fluid in a second chamber and operable by pressure of fluid in said first chamber upon release of fluid under pressure from said second chamber to move said valve structure to said brake release position, spring means for moving said valve structure to said normal position upon supply of fluid under pressure to said first chamber, a pair of spaced apart coaxially arranged valve means, two annular valve seats, one for each of said valve means, arranged for engagement by adjacent ends of said valve means, a member extending between and engaging said pair of valve means for selectively unseating either and at the same time effecting seating of the other, means for actuating said member, said one passage being open to the seat end of one of said valve means outside the respective annular seat, and the last named seat encircling a passage open to said second passage and to the other valve means outside of its annular seat, the last named annular seat encircling a passage open to atmosphere, means for equalizing pressure of fluid outside of said valve seats acting on the one side of the respective valve means on the opposite side thereof, and spring means acting on said one valve means for unseating same against a chosen pressure of fluid acting on the said opposite side thereof.

7. A brake release and application valve device for use with a vehicle fluid pressure brake equipment of the type comprising a brake pipe, at least one normally charged fluid pressure storage reservoir, a brake application and release pipe, a device operable by fluid under pressure to effect an application of brakes on the vehicle and operable upon release of fluid under pressure to effect a release of the vehicle brakes, a brake controlling valve device operable upon a reduction in brake pipe pressure to open said reservoir to said application and release pipe and operative upon supply of fluid under pressure to said brake pipe to disconnect said reservoir from said application and release pipe and open said pipe to a brake release pipe, said brake release and application valve device comprising valve structure controlling communication between said application and release pipe and said fluid pressure operable device and having a normal position for opening said communication and a brake release position for closing said communication and for releasing fluid under pressure from said fluid pressure operable device, movable abutment means subject on one side to pressure of fluid in a first chamber open to said application and release pipe and subject on the opposite side to pressure of fluid in a second chamber and operable by pressure of fluid in said first chamber upon release of fluid under pressure from said second chamber to move said valve structure to said brake release position, spring means for moving said valve structure to said normal position upon supply of fluid under pressure to said first chamber, and a pilot structure controlling communication between said first and second passages comprising a casing having first and second chambers open respectively to said first and second passages, a first check valve disposed in said first chamber for controlling communication therebetween and a port open to said second passage and second chamber, a second check valve in said second chamber for controlling communication therebetween and atmosphere, a member extending between and engaging said check valves for selectively unseating either, manually operative means for actuating said member, a spring in said first chamber for seating said first check valve, and a spring in said second chamber for seating said second check valve and for at the same time unseating said first check valve against a chosen pressure of fluid in said first chamber.

8. A brake release and application valve device for use with a vehicle fluid pressure brake equipment of the type comprising a brake pipe, at least one normally charged fluid pressure storage reservoir, a brake application and release pipe, a device operable by fluid under pressure to effect an application of brakes on the vehicle and operable upon release of fluid under pressure to effect a release of the vehicle brakes, a brake controlling valve device operable upon a reduction in brake pipe pressure to open said reservoir to said application and release pipe and operative upon supply of fluid under pressure to said brake pipe to disconnect said reservoir from said application and release pipe and open said pipe to a brake release pipe, said brake release and application valve device comprising a main body portion having connections with said application and release pipe, said fluid pressure operable means and with atmosphere, a valve structure in said body portion having a normal position for disconnecting said fluid pressure operable means from atmosphere and for opening same to said application and release pipe and having a brake release position for disconnecting said fluid pressure operable means from said application and release pipe and for opening same to atmosphere, a cover for said body portion, a flexible diaphragm clamped between said cover and body portion cooperative with said cover to form a first chamber and cooperative with said body portion to form a second chamber in constant communication with said application and release pipe, means connecting said valve structure to said diaphragm for movement therewith, said diaphragm being operative by pressure of fluid in said second chamber upon release of fluid under pressure from said first chamber to move said valve structure to said brake release position, a spring interposed between said cover and diaphragm operative upon supply of fluid under pressure to said first chamber to move said valve structure to said normal position, and valve means in said cover for selectively supplying fluid under pressure to or for releasing fluid under pressure from said first chamber.

9. A brake release and application valve device for use with a vehicle fluid pressure brake equipment of the type comprising a brake pipe, at least one normally charged fluid pressure storage reservoir, a brake application and release pipe, a device operable by fluid under pressure to effect an application of brakes on the vehicle and operable upon release of fluid under pressure to effect a release of the vehicle brakes, a brake controlling valve device operable upon a reduction in brake pipe pressure to open said reservoir to said application and release pipe and operative upon supply of fluid under pressure to said brake pipe to disconnect said reservoir from said application and release pipe and open said pipe to a brake release pipe, said brake release and application valve device comprising a main body portion having connections with said application and release pipe, said fluid pressure operable means and with atmosphere, a valve structure in said body portion having a normal position for disconnecting said fluid pressure operable means from atmosphere and for opening same to said application and release pipe and having a brake release position for disconnecting said fluid pressure operable means from said application and release pipe and for opening same to atmosphere, a cover for said body portion, a flexible diaphragm clamped between said cover and body portion cooperative with said cover to form a first chamber and cooperative with said body portion to form a second chamber in constant communication with said application and release pipe, means connecting said valve structure to said diaphragm for movement therewith, said diaphragm being operative by pressure of fluid in said second chamber upon release of fluid under pressure from said first chamber to move said valve structure to said brake release position, a spring interposed between said cover and diaphragm operative upon supply of fluid under pressure to said first chamber to move said valve structure to said normal position, a first passage open to said first chamber, a second passage opening said second chamber to said cover, and valve means in said cover for selectively establishing communication between said passages or for closing said communication and opening said first passage to atmosphere.

10. The combination with a brake cylinder pressure release valve device for interposition between a brake control valve device of a fluid pressure brake equipment and fluid pressure operable brake applying means adapted to be controlled thereby, said brake cylinder release valve device comprising a casing, a casing cap, a release valve mechanism in said casing, a first fluid pressure chamber open to said brake control valve device, a second fluid pressure chamber open to said fluid pressure operable brake applying means, a control chamber, and a constantly open passage for connecting said second chamber to said control chamber, of means for converting said release valve device into a combined brake cylinder release and application valve device comprising a plug fitted in said passage, a port opening said first chamber to said passage at a point between said plug and control chamber, valve means associated with said cap selectively operable to open said control chamber either to said passage and port or to atmosphere, and means for actuating said valve means.

11. The combination with a brake cylinder pressure release valve device for interposition between a brake control valve device of a fluid pressure brake equipment and fluid pressure operable brake applying means adapted to be controlled thereby, said brake cylinder release valve device comprising a casing, a casing cap, a release valve mechanism in said casing, a first fluid pressure chamber open to said brake control valve device, a second fluid pressure chamber open to said fluid pressure operable brake applying means, a control chamber, and a constantly open passage for connecting said second chamber to said control chamber, of means for converting said release valve device into a combined brake cylinder release and application valve device comprising valve means associated with said cap for selectively opening said control chamber either to said passage or to atmosphere, means for actuating said valve means, and means opening said passage to said first chamber and disconnecting it from said second chamber.

12. The combination with a brake release valve device interposed between a brake control valve device of a fluid pressure brake equipment and fluid pressure operable brake applying means adapted to be controlled thereby, said brake release valve device comprising a casing, a first fluid pressure chamber open to said brake control device, a second fluid pressure chamber open to said fluid pressure operable brake applying means, a release valve mechanism having a normal position establishing communication between said chambers and a brake release position for closing said communication and for opening said second chamber to atmosphere, a flexible diaphragm connected to said valve mechanism and secured to a clamping face of said casing and object on one side to fluid under pressure in said first chamber and operable thereby upon release of fluid under pressure from a control chamber at its opposite side to move said valve mechanism to its brake release position, a spring in said control chamber acting on said diaphragm for moving said valve mechanism to its normal position upon supply of fluid under pressure to said control chamber, and a passage in said casing for connecting said second chamber to said diaphragm clamping face, of means for converting said brake cylinder release valve device to a combined brake cylinder release and application valve device comprising a plug inserted in said passage, a port in said casing opening said first chamber to said passage at a point between said plug and mounting face, a cap secured to said casing cooperative with said mounting face for clamping said diaphragm, and cooperative with said diaphragm to form said control chamber and supporting said spring to act on said diaphragm, said cap having a first passage open to said control chamber and a second passage open at said mounting face to said casing passage, valve means for selectively opening said first passage either to said second passage or to atmosphere, and means for actuating said valve means.

13. The combination with a brake release valve device interposed between a brake control valve device of a fluid pressure brake equipment and fluid pressure operable brake applying means adapted to be controlled thereby, said brake release valve device comprising a casing, a first fluid pressure chamber open to said brake control device, a second fluid pressure chamber open to said fluid pressure operable brake applying means, a release valve mechanism having a normal position establishing communication between said chambers and a brake release position for closing said communication and for opening said second chamber to atmosphere, a flexible diaphragm connected to said valve mechanism and secured to a clamping face of said casing and subject on one side to fluid under pressure in said first chamber and operable thereby upon release of fluid under pressure from a control chamber at its opposite side to move said valve mechanism to its brake release position, a spring in said control chamber acting on said diaphragm for moving said valve mechanism to its normal position upon supply of fluid under pressure to said control chamber, and a passage in said casing for connecting said second chamber to said diaphragm clamping face, of means for converting said brake release valve device into a combined brake cylinder release and application valve device comprising a cap secured to said mounting face for clamping said diaphragm in place and cooperative with said diaphragm to form said control chamber and to support said spring for acting on said diaphragm, valve means in said cap selectively operable to open said control chamber either to a passage therein or to atmosphere, actuating means fulcrumed on said cap for operating said valve means, said passage in said cap opening to said passage in said casing at said mounting face, a port opening said casing passage to said first chamber, and a plug in said casing passage closing communication between said port and said second chamber.

14. Conversion means for changing a brake cylinder release valve device into a combined brake cylinder release and application valve device, said brake cylinder release valve device being adapted to be interposed between a brake control valve device of a fluid pressure brake equipment and fluid pressure operable brake applying means and comprising a casing, a first fluid pressure chamber open to said brake control device, a second fluid pressure chamber open to said fluid pressure operable brake applying means, a release valve mechanism having a normal position establishing communication between said chambers and a brake release position for closing said communication and for opening said second chamber to atmosphere, a flexible diaphragm connected to said valve mechanism and secured to a clamping face on said casing and subject on one side to fluid under pressure in said first chamber and operable thereby upon release of fluid under pressure from a control chamber at its opposite side to move said valve mechanism to its brake release position, a spring in said control chamber acting on said diaphragm for moving said valve mechanism to its normal position upon supply of fluid under pressure to said control chamber, and a passage in said casing for connecting said second chamber to said diaphragm clamping face, said conversion means comprising a cap secured to said mounting face for clamping said diaphragm in place and cooperative with said diaphragm to form said control chamber and to support said spring for acting on said diaphragm, valve means in said cap selectively operable to open said control chamber either to a passage therein or to atmosphere, actuating means for said valve means, said passage in said cap opening to said passage in said casing at said mounting face, a drilled opening in said casing connecting said casing passage to said first chamber, and a plug in said casing passage closing communication between said drilled opening and said second chamber.

15. A control device for selectively opening a fluid pressure conduit either to a fluid pressure supply passage or to atmosphere comprising a casing having two coaxially aligned spaced apart chambers, an annular valve seat on each of the adjacent end walls of said chambers extending into the respective chamber, a passage open to one of said chambers through the respective valve seat and to the other chamber around the respective valve seat, means connecting said passage to said fluid pressure conduit, said fluid pressure supply passage being open to said one chamber around the respective valve seat, said casing having a passage open to said other chamber through the respective valve seat and also open to atmosphere, a check valve slidably mounted in each of said chambers for cooperation with the respective valve seat and having a fluid pressure equalizing communication therethrough connecting opposite sides of the check valve, pin means slidably mounted in said casing extending between and engaging the two check valves holding said check valves apart a distance greater than the distance between the respective seats, means for actuating said pin to unseat either of said check valves, means for seating the check valve in said one chamber upon unseating of the other check valve, and means acting on said other check valve for seating same and for also unseating the check valve in said one chamber against a chosen pressure of fluid in said one chamber.

RALPH T. WHITNEY.

REFERENCES CITED

The following references are of record in the file of this patent:

UNITED STATES PATENTS

| Number | Name | Date |
|--------|------|------|
| 2,366,192 | Johnson | Jan. 2, 1945 |